United States Patent Office 3,410,656
Patented Nov. 12, 1968

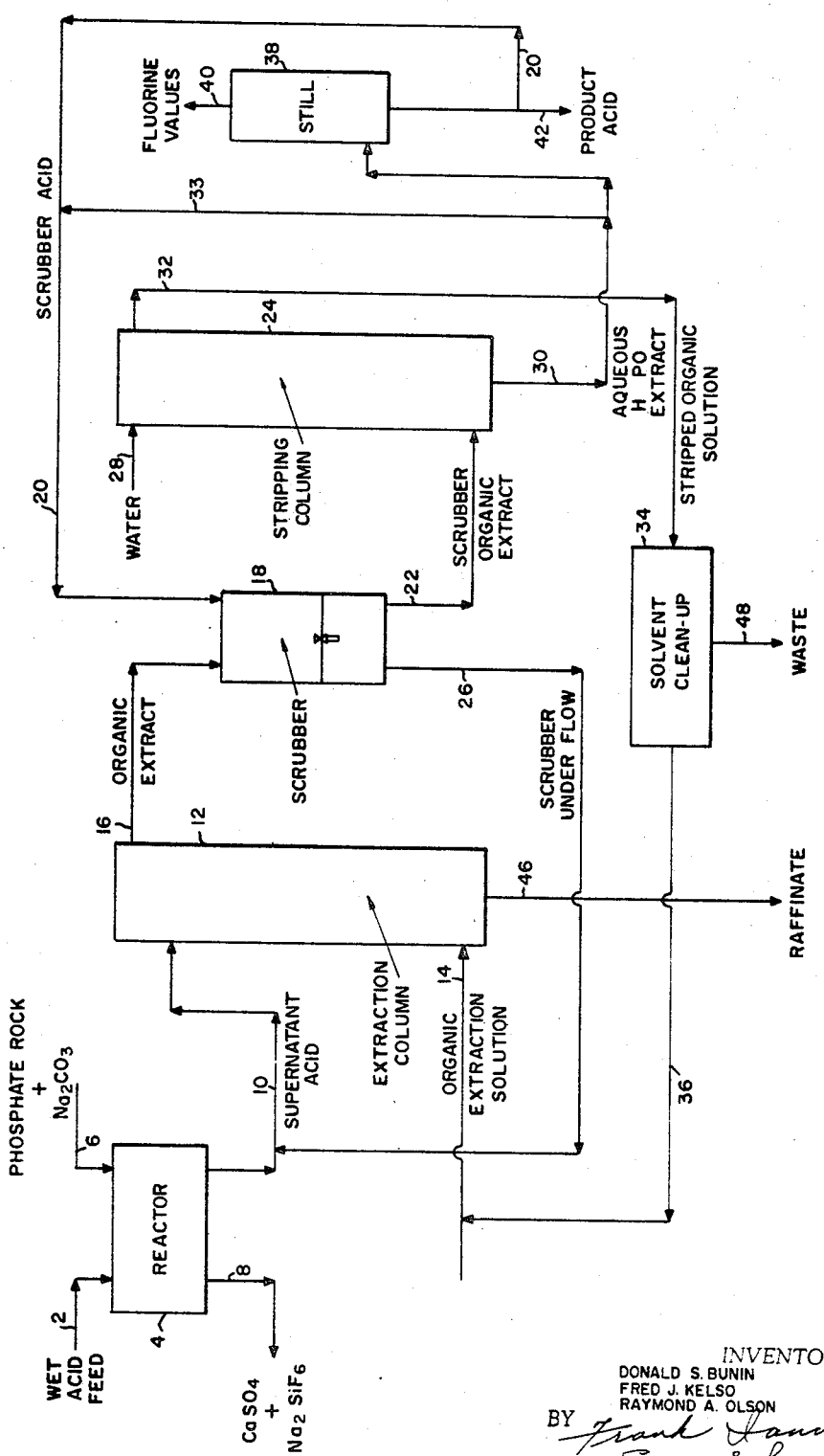

3,410,656
PHOSPHORIC ACID PURIFICATION
Donald S. Bunin, Metuchen, Fred J. Kelso, Clark, and Raymond A. Olson, Westfield, N.J., assignors to FMC Corporation, New York, N.Y., a corporation of Delaware
Continuation-in-part of application Ser. No. 524,272, Feb. 1, 1966. This application June 1, 1966, Ser. No. 554,563
11 Claims. (Cl. 23—165)

ABSTRACT OF THE DISCLOSURE

A purified phosphoric acid is obtained by contacting wet acid, obtained by sulfuric acid acidulation of phosphatic ores with an organic extracting solution having limited solubility therein, in amounts sufficient to extract up to 85% of the $P_2O_5$ values obtained in the wet acid, the organic extracting solution containing an organic phosphate which may be either an alkly phosphate, aryl phosphate or alkyl aryl phosphate diluted with an organic solvent, recovering an extract lower in impurities than the wet acid, separating the extract from an aqueous raffinate, contacting the extract with water in amounts sufficient to strip the $P_2O_5$ values from the extract and form phosphoric acid and separating a purified aqueous phosphoric acid solution from the remaining organic extracting solution.

---

This application is a continuation-in-part of patent application Ser. No. 524,272, filed Feb. 1, 1966 in the names of the present inventors, and now abandoned.

This invention relates to the purification of phosphoric acid obtained by acidulation of phosphatic ores with mineral acids.

One well-known process for recovering the phosphate values from a phosphatic ore in the form of phosphoric acid is the "wet acid" process. In this process a phosphate rock which generally contains phosphorus in the form of $Ca_{10}F_2(PO_4)_6$ is acidulated with a mineral acid, normally sulfuric acid, to precipitate calcium values and recover phosphoric acid. The resultant wet acid is recovered by filtering it from insolubles in the acidulated mixture and is suitable for use in most fertilizer applications without further treatment, but is not suitable for most other applications without subsequent treatment, because of its relatively high impurity level.

It has been customary to purify wet acid intended for use in nonfertilizer applications to remove undesirable amounts of impurities, particularly metal impurities. One of these purification techniques involves using hydrochloric acid as the acidulating mineral acid followed by extraction of $P_2O_5$ values in the resulting "wet acid" with organic solvents such as alkyl or aryl phosphates and recovering the $P_2O_5$ values from the extract. The extraction of the $P_2O_5$ values from impurities that remain behind in the raffinate is enhanced by using hydrochloric acid as the acidulating acid because of the formation of calcuim chloride salt in the wet acid solution; this salt exerts a "salting out effect" which aids in transferring $P_2O_5$ values to the organic extract phase.

While these extractants are effective in processes using hydrochloric acid for acidulation they have not been found effective in extracting the $P_2O_5$ values from sulfuric acid acidulated wet acid. Undesirably, when these organic extractants are mixed with the wet acid obtained by sulfuric acid acidulation there is obtained a gelatinous precipitate in the remaining raffinate which prevents effective separation of the organic and aqueous phases, Further, the lack of calcium chloride in the wet acid obtained by sulfuric acid acidulation prevents salting out of $P_2O_5$ into the organic phase. As a result these extraction techniques can be commercially applied only with "wet acid" obtained by acidulation with the more expensive hydrochloric acid, rather than wet acid obtained by conventional and less expensive sulfuric acid acidulation.

As a result there has been a need for a process which will purify phosphoric acid, obtained by conventional sulfuric acid acidulation of phosphatic ores, which is inexpensive and which can readily be carried out to produce a purified phosphoric acid.

It is an object of the present invention to satisfy the above need and to reduce the impurity level of "wet acid," obtained by sulfuric acid acidulation of phosphatic ores, on a commercial scale, in a simplified and readily workable process.

It is a further object to purify wet acid derived from sulfuric acid acidulated phosphatic ores.

Other objects will be apparent from the following description.

We have found that "wet acid" obtained by sulfuric acid acidulation of phosphatic ores can be purified by (a) contacting said wet acid with an organic extracting solution having limited solubility therein in amounts sufficient to extract no more than 85% and preferably from 50–85% of the $P_2O_5$ values therein, said organic extracting solution containing an organic phosphate which may be either an alkyl phosphate, an aryl phosphate or an alkyl aryl phosphate diluted with an organic solvent, obtaining an extract lower in impurities than the wet acid and containing preferably from 50–85% of the $P_2O_5$ values contained in the wet acid; (b) preferably scrubbing the extract with an aqueous phosphoric acid of greater purity than said wet acid to reduce the metal impurity level of said extract; (c) contacting the scrubbed extract with water in amounts sufficient to strip the phosphatic values from the extract and to form phosphoric acid, separating the formed phosphoric acid from the remaining organic extracting solution; and (d) recovering a phosphoric acid solution having a higher purity than said wet acid.

The above defined process unexpectedly achieves two desirable results, namely, selective extraction of $P_2O_5$ values from sulfate values (reported at $SO_3$) introduced by the acidulating sulfuric acid, and the prevention of a gelatinous precipitate in the raffinate which would preclude proper separation of the aqueous phase from the organic phase in the extraction step.

In carrying out the present invention wet acid (phosphoric acid), obtained by acidulating a phosphatic ore with sulfuric acid, is preferably treated to remove residual sulfate and fluosilicate impurities remaining in solution in order to facilitate subsequent extraction of $P_2O_5$ values. This may be conveniently carried out by adding a sodium salt and calcium salt that are soluble in the acid in order to precipitate calcium sulfate and sodium fluosilicate ($Na_2SiF_6$). The amount of the added sodium and calcium salts will depend upon the concentration of sulfate and fluosilicic acid which remains in the wet acid; the amount of these impurities varies from producer to producer. For convenience sake, sodium carbonate and ground phosphate rock may be employed to provide sodium and calcium values, respectively, because they are readily available and inexpensive. Also, the phosphate rock adds its $P_2O_5$ values to the wet acid.

The resulting sodium fluosilicate and calcium sulfate precipitate is separated from the remaining wet acid and the acid is passed into one or more extraction zones. The acid is passed preferably into the top of the column and extracted countercurrently with an organic extracting solution which is substantially water insoluble. The organic extracting solution is made up of either an alkyl phosphate, an aryl phosphate or an alkyl aryl phosphate that contains no more than about 8 carbon atoms in the aryl or alkyl substituent, diluted with an organic solvent.

Examples of such alkyl phosphates are tri-n-butylphosphate, triethylphosphate, triisobutylphosphate, diethylhexylphosphate, tris(2-ethylhexyl)phosphate, trioctylphosphate, and ethyl dibutylphosphate. In addition certain alkoxy subsituted alkyl phosphates are operative such as tris-butoxyethyl phosphate and are included in the term alkyl phosphate. Examples of aryl phosphates that have been found workable are tricresylphosphate, dicresylxylylphosphate and cresyldiphenylphosphate. The preferred phosphate is tri-n-butylphosphate.

The alkyl or aryl phosphate is diluted with an organic solvent that has limited solubility in water to improve phase separation. The solvent also facilitates extraction by lowering the viscosity and density of the organic phase. Suitable solvents include benzene, toluene, xylene, monochlorobenzene, o-dichlorobenzene, decahydronaphthalene, low boiling petroleum hydrocarbons such as petroleum naphtha, kerosene, and saturated aliphatic hydrocarbons such as N-hexane. The volume ratio of organic phosphate to solvent may be from 10:1 to 0.5:1 with a ratio of 3:1 being preferred.

The volume ratio of organic extracting solution to wet acid can vary from about 1:1 to about 10:1 to extract no more than 85% and preferably from 50-85% of the $P_2O_5$ values of the wet acid. The volume ratio selected must not extract more than 85% of the $P_2O_5$ values present in the wet acid to avoid the formation of a gelatinous mass in the raffinate during the extraction step. A preferred volume ratio is about 4:1.

In the extracting stage of the process up to about 85% of the $P_2O_5$ values present in the wet acid are loaded into the organic extract leaving behind the bulk of the mineral impurities in the raffinate. This extraction step can be carried out in any suitable extraction device such as mixer-settlers, agitated columns, liquid-liquid centrifugal contractors and the like. The resultant raffinate which contains unextracted $P_2O_5$ values and mineral impurities in an aqueous solution can be used in producing fertilizer, e.g., triple superphosphate thereby utilizing unextracted $P_2O_5$ values. The extraction step is normally carried out at temperatures of from 20–100° C. for best results; room temperatures can be employed for ease of operation.

The organic extract is then preferably passed to a scrubber unit where it is scrubbed with an aqueous phosphoric acid of greater purity than the wet acid; product acid or aqueous $H_3PO_4$ from the stripper (as defined hereinafter) is normally used for this purpose. In this step a large portion of the iron and other metal impurities can be removed from the organic extract if present. The volume ratio of organic extract to phosphoric acid can be from 10:1 to about 40:1 with about 20:1 being preferred. In this operation enough acid is added to the organic extract to remove the mineral impurities in the organic extract below any required level. For example, enough phosphoric acid may be added to reduce the iron level below a ratio of iron to $P_2O_5$ of 1:5500. The exact amount of acid used will vary depending upon the initial impurity level of organic extract. This scrubbing step can be carried out in the same type of equipment specified for the extraction step and is preferably carried out at a temperature of 40–100° C.; ambient room temperatures can be employed, if desired, for ease of operation. If the metal impurity level is sufficiently low, this step can be eliminated.

The concentration of phosphoric acid used for scrubbing is normally about the same as the concentration of the original wet acid feed in order that it be in equilibrium with the $P_2O_5$ values in the organic extract. In this way no $P_2O_5$ values are transferred between the organic phase and the scrubbing phosphoric acid; this is the preferred mode of operation in continuous processing.

The scrubbed organic extract is then passed into a stripping column and stripped of its $P_2O_5$ values by contacting it with water. Enough water is added to remove stantially all of the $P_2O_5$ values present in the scrubbed organic extract. If desired, the water used for stripping the $P_2O_5$ values may contain salts such as alkali metal carbonates or hydroxides to facilitate the stripping. In general it is not desirable to remove the last traces of $P_2O_5$ from the scrubbed organic extract since this would necessitate using excessive amounts of water and would result in unnecessary dilution of the resultant aqueous acid extract. Good results have been obtained with volume ratios of scrubbed organic extract to water of from 5:1 to 12:1, the exact ratio depending on the amount of $P_2O_5$ in the scrubbed organic extract. The stripping is preferrably carried out at temperatures of from 40–100° C.; ambient room temperatures can be employed for ease of operation if desired.

After the stripping operation has been completed the aqueous phosphoric acid extract which is recovered contains substantially all $P_2O_5$ values extracted from the wet acid feed. The stripped organic extracting solution from the stripping column may be purified, e.g., by treatment with activated charcoal, an alkali wash, and/or distillation to remove soluble organic wastes, and is recycled for further extraction.

The resultant aqueous phosphoric acid extract may contain fluorine impurities. These may be removed if present by heating the extract to a temperature of from 110–150° C., so that it boils and expels fluorine values from the solution. The exact boiling temperature depends on the concentration of $P_2O_5$ values in the solution. During this operation substantially all the fluorine values except trace amounts are removed. This heating stage may be a mere refluxing of the acid solution or the solution may be concentrated by allowing water vapor to escape from the system. The resultant phosphoric acid is then recovered as a purified acid, having a much higher purity level than wet acid.

In a few instances the resulting aqueous acid product may have a slight color due to the presence of minute amounts of residual organic impurities. These impurities can be removed when required by contacting the product acid with charcoal and adsorbing the impurities on the charcoal. The resultant acid will then be water-white with no trace of color.

This process will now be described with reference to the attached drawing which is a schematic flow plan of the process.

In the drawing a wet acid feed having a concentration of 30–54% $P_2O_5$ is passed through line 2 into a reactor 4. A mixture of phosphate rock and sodium carbonate is passed through line 6 into reactor 4. The calcium values in the phosphate rock react with any sulfate values in the wet acid feed to form insoluble calcium sulfate while the sodium carbonate reacts with any fluosilicic acid to form insoluble sodium fluosilicate. The precipitate is removed from the base of the reactor 4 through line 8 and discarded while the remaining supernatant acid is passed through line 10 into the top of extraction column 12.

An organic extracting solution is passed through line 14 into extraction column 12 and mixed with the supernatant acid from line 10. It is preferred that the acid and extracting solution be passed countercurrent to one another in the extraction column. In extraction column 12 up to 85% of the $P_2O_5$ values in the supernatant acid are loaded into the organic extract. The bulk of the mineral impurities are left behind in the raffinate with unextracted $P_2O_5$ values and are removed from the base of the column through line 46. The extract is removed from column 12 through line 16 and passed into a scrubber 18. Simultaneously a purified phosphoric acid (scrubber acid) is passed through line 20 into scrubber unit 18 and mixed with the organic extract therein.

The purified phosphoric acid scrubs the organic extract in scrubber 18 to remove iron and other cationic impurities from the organic extract. The scrubbed organic extract is then removed from scrubber 18 via line 22 and passed into a stripping column 24. The scrubber acid underflow is removed from scrubber 18 by line 26 and mixed with the supernatant acid in line 10 for treatment in extraction column 12. Water is added to stripping column 24 through line 28 and mixed with the scrubbed organic extract therein. In this column the water strips the $P_2O_5$ values from the organic extract and substantially all of the $P_2O_5$ values are removed through line 30 as phosphoric acid at the base of the stripping column 24. The stripped organic solution is removed from stripping column 24 through line 32 and is treated in a solvent clean-up stage 34 for removal of soluble organic wastes. The solvent clean-up stage 34 may be a charcoal filter through which the organic solvent is passed and may include a distillation column for greater purification of the organic extracting solution.

The waste is removed from the solvent clean-up stage 34 through line 48, and the purified organic extracting solution is passed through line 36 into line 14 for additional extraction in extraction column 12. The aqueous $H_3PO_4$ extract (phosphoric acid) is then passed through line 30 into a still 38 and heated to a temperature of from 110–150° C. During this stage any fluorine values are evolved through overhead line 40 and the purified phosphoric acid is removed through line 42 at the base of still 38 as product acid.

The scrubber acid may be supplied by recycling a portion of the aqueous $H_3PO_4$ extract from stripping column 24 through lines 30, 33 and 20 to scrubber 18. Alternately, a portion of the product acid may be recycled as scrubber acid through lines 42 and 20.

The following examples are given to illustrate the present invention and are not deemed to be limiting thereof. Example 1 was carried out in accordance with the flow plan specified in the drawing.

Example 1

A wet acid, obtained by acidulation of a phosphatic ore with sulfuric acid, was fed into a reactor. The acid feed charged into the reactor weighed 2280 g. and contained the ingredients set forth in Table I. To this reactor was added phosphate rock and sodium carbonate, and a precipitate of calcium sulfate and sodium fluosilicate was obtained. The supernatant acid was separated from the sludge, and continually mixed with 240 g. of phosphoric acid scrubber underflow (as defined hereinafter) and continuously passed forward (total weight 2520 g.) into the top of an extraction column. An organic extracting solution weighing 5510 g., and made up of tri-n-butylphosphate and kerosene in a volume ratio of 3:1, was also fed continuously into the extraction column and mixed with the supernatant acid. The extraction was carried out at a temperature of 20–30° C. for a period of 3 hours. The extract (total weight of 6,372 g.) was removed continuously from the upper portion of the extraction column and a raffinate (total weight 1634 g.) was removed continuously from the base of the column. The organic extract was then passed into a scrubbing unit and scrubbed with a total of 240 g. of a detergent grade product acid. The scrubbed organic extract (total weight 6375 g.) was then passed forward continuously into a stripping column while the scrubber underflow (about 240 g.) was passed into the extraction column along with supernatant acid to recover $P_2O_5$ values in the scrubber acid. Eleven hundred grams of water was then passed continuously into the stripping column and mixed with the scrubbed organic extract. An aqueous extract of phosphoric acid (total weight 1461 g.) was removed from the base of the stripping column and the stripped organic solution (total weight 5730 g.) was removed from the top of the column. The aqueous acid extract was passed forward to a still where it was heated to 150° C. to volatilize fluorine values overhead and to recover a product acid from the base of the still. The stripped organic solution from the stripping column was passed continuously through charcoal, distilled, and recycled for additional use to the extraction column. A total of 240 g. of organic waste was removed from the organic solution. The concentrations of $P_2O_5$ and impurities in each of these solutions, including the final product acid, are given in Table I.

TABLE I

| Mineral Values | Wet Acid Feed, Percent | Supernatant Acid Mixture (2,520 g.), Percent | Organic Solution (5,510 g.), Percent | Organic Extract (6,372 g.), Percent | Raffinate (1,634 g.), Percent | Scrubber Underflow (240 g.), Percent | Scrubbed Organic Extract (6,375 g.), Percent | Stripped Organic Solution (5,730 g.), Percent | Aqueous $H_3PO_4$ Extract (1,461 g.), Percent | Product Acid, Percent |
|---|---|---|---|---|---|---|---|---|---|---|
| $P_2O_5$ | 43.63 | 43.68 | 0.19 | 9.40 | 30.75 | 39.42 | 9.03 | 0.17 | 33.57 | 33.57 |
| CaO | 0.33 | 0.56 | [2] Na | 0.03 | 0.74 | [2] Na | 0.01 | [2] Na | [2] Na | [2] Na |
| $SO_4$ [1] | 1.40 | 0.35 | [2] Na | 0.04 | 0.46 | 0.01 | 0.04 | [2] Na | 0.04 | 0.04 |
| F | 0.70 | 0.19 | 0.04 | 0.04 | 0.25 | [2] Na | [2] Na | 0.04 | 0.06 | Trace |
| $Fe_2O_3$ | 1.41 | 1.42 | 0.0009 | 0.012 | 1.98 | 0.24 | 0.002 | 0.0009 | 0.0098 | 0.0098 |
| $R_2O_3$ [3] | 3.10 | 3.11 | 0.013 | 0.024 | 4.56 | 0.37 | 0.0125 | 0.0131 | 0.0114 | 0.0114 |
| $SiO_2$ | 0.40 | 0.10 | [2] Na | 0 | 0.15 | 0 | 0 | 0 | 0 | 0 |

[1] Reported as $SO_3$.   [2] Not analyzed.   [3] Total of all trivalent metallic oxide impurities (including $Fe_2O_3$).

Example 2

A wet acid obtained by acidulation of a phosphatic ore with sulfuric acid was fed continuously into the top of an extraction column until a total of 2775 g. was fed. An organic extracting solution, weighing 9650 g. and made up of tri-n-butylphosphate and N-hexane in a volume ratio of 3:1, was also fed continuously into the extraction column and mixed with the acid. The extraction was carried out at a temperature of 20–30° C. for a period of 4 hours. The extract (10,942 g.) was removed continuously from the upper portion of the extraction column and a raffinate (1,383 g.) was removed continuously from the base of the column. The organic extract was passed continuously into the stripping column (without scrubbing) and 2540 g. water was added continuously to strip the $P_2O_5$ values from the organic. An aqueous extract of phosphoric acid (3540 g.) was removed continuously from the base of the stripping column while the stripped organic was recycled to the extraction column.

The concentration of $P_2O_5$ and impurities of these solutions are shown in Table II.

TABLE II

| | Feed Acid (2,775 g.) | Feed Organic (9,650 g.) | Extraction | | Stripping | |
|---|---|---|---|---|---|---|
| | | | Raffinate (1,383 g.) | Extract (10,942 g.) | Product Acid (3,540 g.) | Stripped Organic Solution (9,700 g). |
| Percent: | | | | | | |
| $P_2O_5$ | 40.77 | 1.50 | 22.10 | 8.45 | 24.34 | 0.68 |
| $SO_4$ [1] | 1.89 | 0 | 2.56 | 0.10 | 0.13 | [2] ND |
| F | 0.61 | 0.03 | 0.46 | 0.10 | 0.10 | 0.07 |
| CaO | 0.042 | 0 | 0.098 | <0.0001 | 0.0001 | <0.0001 |
| $Fe_2O_3$ | 1.06 | 0 | 1.74 | 0.043 | 0.0063 | [2] ND |
| $Al_2O_3$ | 0.26 | 0 | 0.49 | 0.0007 | 0.0004 | <0.0004 |
| MgO | 0.73 | 0 | 1.33 | <0.0001 | 0.0002 | [2] ND |

[1] Reported as $SO_3$.  [2] Non-detected.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process of purifying wet acid obtained by sulfuric acid acidulation of phosphatic ores which comprises contacting said wet acid with an organic extracting solution having limited solubility therein in amounts sufficient to extract up to 85% of the $P_2O_5$ values contained in said wet acid, said organic extracting solution containing an organic phosphate selected from the group consisting of alkyl phosphates, aryl phosphates and alkyl aryl phosphates diluted with an organic solvent having limited solubility in said wet acid, recovering an extract lower in impurities than said wet acid, separating said extract from an aqueous raffinate, contacting said extract with water in amounts sufficient to strip the $P_2O_5$ values from said extract and forming phosphoric acid, separating an aqueous phosphoric acid solution from the remaining organic extracting solution, and recovering as a product a phosphoric acid solution having a higher purity than said wet acid.

2. Process of claim 1 wherein said extract which is separated from said aqueous raffinate is scrubbed with an aqueous phosphoric acid of a greater purity than said wet acid thereby reducing the impurity level of said extract, separating a scrubbed extract from the scrubbing phosphoric acid, contacting said scrubbed extract with water in amounts sufficient to strip the $P_2O_5$ values therefrom and forming phosphoric acid, separating an aqueous phosphoric acid solution from the remaining organic extracting solution, and recovering as a product a phosphoric acid solution having a higher purity than said wet acid.

3. Process of claim 1 wherein said organic phosphate and said organic solvent are present in said extracting solution in a volume ratio of 10:1 to 0.5:1 and wherein the volume ratio of said extracting solution to wet acid is from 1:1 to 10:1.

4. Process of claim 1 wherein the volume ratio of said organic phosphate to said organic solvent in said extracting solution is 3:1 and wherein the volume ratio of said solution to wet acid is 4:1.

5. Process of claim 1 wherein the organic phosphate is tri-n-butylphosphate and the organic solvent is kerosene.

6. Process of claim 1 wherein the final phosphoric acid solution is treated with charcoal and a phosphoric acid product is recovered which is water-white.

7. Process of claim 2 wherein the volume ratio of said organic phosphate and said organic solvent in said extracting solution is from 10:1 to 0.5:1 and the volume ratio of said extract solution to wet acid is from 1:1 to 10:1, said organic extract is scrubbed with said aqueous phosphoric acid in a volume ratio of from 10:1 to 40:1, and said scrubbed organic extract is stripped with water in a volume ratio of 5:1 to 12:1.

8. Process of claim 1 wherein said wet acid is first treated prior to extraction with said organic extracting solution by adding a calcium salt and a sodium salt that are soluble therein to precipitate sodium fluosilicate and calcium sulfate, the precipitate is separated from the supernatant acid, and said supernatant acid is subsequently contacted with said organic extracting solution.

9. Process of claim 1 wherein said aqueous phosphoric acid separated from said remaining organic extracting solution is heated to a temperature of from 110° to 150° C. to vaporize any fluorine values therein prior to recovering the phosphoric acid solution as a final product.

10. Process of claim 1 wherein from 50–85% of the $P_2O_5$ values present in said wet acid are extracted by said organic extracting solution.

11. Process of claim 1 wherein the organic solvent is N-hexane.

References Cited

UNITED STATES PATENTS

| 3,298,782 | 1/1967 | Archambault | 23—165 |
| 3,366,448 | 1/1968 | Martin et al. | 23—165 |
| 2,917,367 | 12/1959 | Hodges et al. | 23—165 |
| 3,072,461 | 1/1963 | Long et al. | 23—165 |
| 3,124,419 | 3/1964 | Germain et al. | 23—165 |

OSCAR R. VERTIZ, *Primary Examiner.*

A. GREIF, *Assistant Examiner.*